(12) United States Patent
Fine et al.

(10) Patent No.: US 8,744,348 B2
(45) Date of Patent: Jun. 3, 2014

(54) METHOD OF PRESELECTING AT LEAST ONE APPLICATION IN A MOBILE COMMUNICATION DEVICE COMPRISING AN NFC SYSTEM

(75) Inventors: Jean-Yves Fine, Meudon (FR); Alain Rhelimi, Meudon (FR)

(73) Assignee: Gemalto SA, Meudon (FR)

( * ) Notice: Subject to any disclaimer, the term of this patent is extended or adjusted under 35 U.S.C. 154(b) by 122 days.

(21) Appl. No.: 13/263,705

(22) PCT Filed: Mar. 30, 2010

(86) PCT No.: PCT/EP2010/054170
§ 371 (c)(1),
(2), (4) Date: Oct. 7, 2011

(87) PCT Pub. No.: WO2010/115770
PCT Pub. Date: Oct. 14, 2010

(65) Prior Publication Data
US 2012/0034868 A1    Feb. 9, 2012

(30) Foreign Application Priority Data

Apr. 8, 2009   (EP) ..................................... 09305301

(51) Int. Cl.
*H04B 5/00*        (2006.01)
(52) U.S. Cl.
USPC ...... 455/41.1; 455/41.2; 455/418; 455/552.1; 455/556.1; 455/557; 455/558
(58) Field of Classification Search
USPC ......... 455/41.1, 418, 419, 41.2, 552.1, 556.1, 455/556.2, 557, 558
See application file for complete search history.

(56) References Cited

U.S. PATENT DOCUMENTS

| | | | |
|---|---|---|---|
| 7,130,622 B2 * | 10/2006 | Vanska et al. ................. | 455/419 |
| 7,881,709 B2 | 2/2011 | Wakasa et al. | |
| 7,954,723 B2 | 6/2011 | Charrat | |
| 8,060,012 B2 * | 11/2011 | Sklovsky et al. ............ | 455/41.1 |
| 2008/0254780 A1 * | 10/2008 | Kuhl et al. .................... | 455/418 |

FOREIGN PATENT DOCUMENTS

WO    WO2004040923 A    5/2004

OTHER PUBLICATIONS

PCT/EP2010/054170, International Search Report, European Patent Office, Aug. 6, 2010, P.B. 5818 Patentlaan 2 NL—2280 HV Rijswijk.
PCT/EP2010/054170, Written Opinion of the International Searching Authority, Aug. 6, 2010, European Patent Office, P.B. 5818 Patentlaan 2 NL—2280 HV Rijswijk—Pays Bass.

* cited by examiner

*Primary Examiner* — Tuan A Tran
(74) *Attorney, Agent, or Firm* — The Jansson Firm; Pehr B. Jansson

(57) ABSTRACT

The invention relates to a method for the preselection of at least one application hosted in a secure or non-embedded element in a mobile communication device comprising an NFC system, the said device being capable of accessing and reading data stored in a target NFC system, of the contactless tag or card type, the said NFC system being capable of operating in at least two communication modes including a reader mode, and a card emulation mode, or a Peer-to-Peer mode. When the NFC system is in the reader mode, an application is preselected during a stage wherein data stored in the said target NFC system are read.

18 Claims, 1 Drawing Sheet

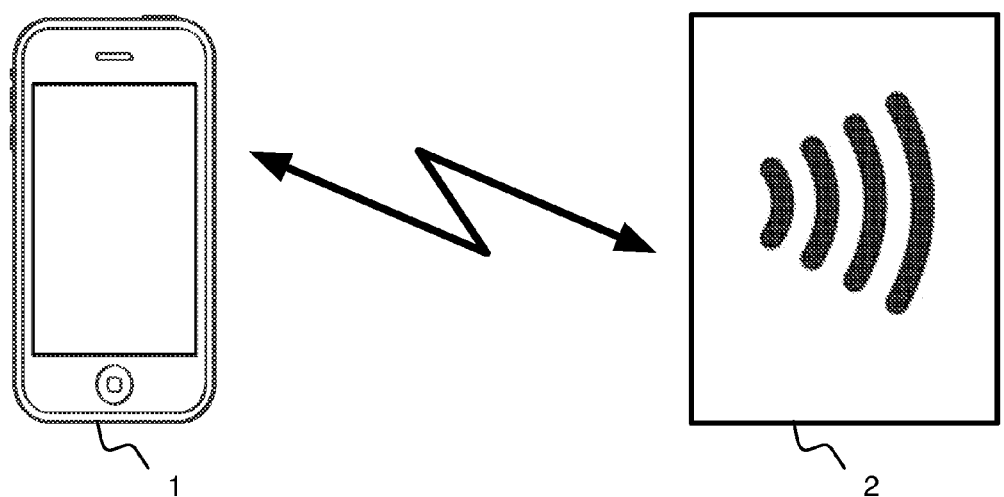

METHOD OF PRESELECTING AT LEAST ONE APPLICATION IN A MOBILE COMMUNICATION DEVICE COMPRISING AN NFC SYSTEM

BACKGROUND OF THE INVENTION

1. Technical Field

This invention relates to the field of wireless telecommunications over a very short distance, called NFC or "Near Field Communication".

This invention particularly relates to the area of applications hosted in a secure or non-embedded element in a mobile device operating in accordance with NFC standards, particularly the area of contactless transactions carried out with NFC terminals capable of reading electronic tags or cards.

2. Description of the Related Art

Contactless Near Field Communication transmission technology allows communication between a coupler (belonging to the infrastructure) and a mobile wireless communication device or between at least two mobile wireless communication devices. The technology is based on data transmission via the modulation of a magnetic field produced by the coil of a reader (PCD or Proximity Coupling Device) and return data transmission via the modulation of the current induced by coupling in the coil of a card (PICC: Proximity Integrated Circuit Card). Modulation techniques and protocols have for example been described in standards such as standard ISO 14443 or standard ISO 18092.

Devices integrating NFC technology operate in accordance with standard communication protocols, such as for instance ISO 14443, ISO 18092, JIS X6319-4 or proprietary protocols.

Three modes of operating are usually available:

- A Reader mode allows reading from and writing on contactless cards and/or contactless electronic tags, also called "smart posters". For example, that mode allows a user to read information by holding a wireless mobile communication device before electronic tags that may for instance be placed in the street, on posters, on parcels, in bus shelters etc. In this mode, the wireless mobile communication device becomes a reader of passive tags or contactless cards.
- A Card emulation mode allows the emulation of a contactless card, that is to say that the wireless mobile communication device associated with a security element, such as of the smart card type, emulates the working of a contactless smart card.
- A P2P (Peer to Peer) mode makes it possible to do away with the master role of the reader or the slave role of the card by allowing balanced behaviour (with no master or slave) between two NFC devices.

A wireless mobile communication device may host several applications that may be in conflict, that is to say they cannot be interfaced with the infrastructure coupler as they use incompatible communication settings.

The NFC wireless mobile communication device is a multi-mode and multi-protocol device.

An application is defined by a mode and protocol configuration. In general, the wireless mobile communication device may include different applications such as reader type applications, card emulation type applications or others. For reader applications, the wireless mobile communication device is in reader mode to read from or write on a remote device through contactless technology. The wireless mobile communication device is in this case used as an RFID reader. For card emulation type applications, the NFC wireless mobile communication device is in card emulation mode so as to be read by conventional couplers in payment or paid-for access control applications (payment machine, transport network entrance etc.). The wireless mobile communication device, for example a mobile telephone, is then used like a smart card. The application program is for instance held and executed by a secure processor, and access to the service requires identification of the subscriber. A permissive card reader may according to the standards quoted above accept all cards regardless of their parameters.

However, with the current NFC standards, those parameters are not only necessary for establishing a connection to carry the application data and commands. Some parameters contain application data that no longer allow generic setting up independently from the applications. Parameters that do not contain application data are sometimes tested by the reader. The reader may then reject the card altogether when the parameters shown by the card are not strictly and uniquely those that are expected by the reader. That may sometimes lead to conflicts between applications that cannot share the same NFC connection parameters.

A solution concerning the cohabitation of several applications using the card emulation mode may for instance consist in using an algorithm according to which each application is sent to the terminal with all its NFC parameters and two masks A and B. Mask A applied to the parameters provides information about the data that are required and expected by the reader. Mask B applied to the parameters provides information about the data that are not tested by the reader. According to this algorithm, two applications do not conflict with each other if the merging of their parameters (logical AND) does not contain differences (exclusive OR) in respect of the parameters expected by the readers and/or if there are differences, they relate to data that are not expected by the readers.

With this solution, the user of the mobile device has the means to detect applications with conflicts and to preselect the applications that can cohabit in order to carry out the transaction rapidly without requiring any intervention by the user, particularly at a stage where time is critical, for example in applications relating to the transport of users.

However, this solution is not entirely satisfactory. That is because the user may need to activate an application in conflict with a group of applications with no conflict. Further, some applications such as banking applications are exclusive of each other, even if they are not in conflict. As a result, for such applications, the user must know exactly with which bank account they will pay their transaction. That leads to repeated switching, which is neither ergonomic or desirable, of the preselection of applications, which can lead to the depreciation of NFC technology in use.

In order to correct those drawbacks, one of the aims of this invention is to offer a simple means to preselect one or more applications that can share the same parameters relating to NFC technology.

DETAILED DESCRIPTION

To that end, one of the objectives of this invention is a method for preselecting at least one application in a mobile communication device comprising an NFC system, the said device being capable of accessing and reading data stored in a target NFC system, of the card or contactless electronic tag type, the said NFC system being capable of operating in at least two modes of communication including a reader mode, and a card emulation mode, or a Peer-to-Peer mode, characterised in that when the NFC system is in the reader mode, at least one application is preselected during a stage wherein information stored in the said target NFC system is read.

Such a method makes it possible to rapidly preselect an application or a group of applications in a mobile terminal without using the user interface of the terminal.

Such preselection is advantageously temporary and thus allows the user to go back to an earlier preselection.

Such preselection is automatic, and as simple and user friendly as the transaction that is to be carried out.

The other characteristics are as follows:
- the method can detect the presence of the target NFC system by automatically switching operating modes;
- during the stage wherein data stored in the target NFC system are read, data can be extracted that are capable of identifying the said at least one application and the period of validity of the said at least one application;
- the period of validity of the said at least one application can be automatically temporary by default;
- the method may comprise a stage wherein the validity period is confirmed by a user;
- the validity period can be selected through the user interface of the said mobile communication device;
- the formatted application data of the contactless tag may contain data that are capable of locating a remote server;
- a remote server may be located so as to download an application when it is missing from the mobile communication device or is incomplete or obsolete;
- the contactless electronic tag may contain the application to host in the mobile communication device.

The invention also concerns a mobile communication device that uses such a method, the said mobile communication device comprising an NFC system and being capable of accessing and reading data stored in a target NFC system, of the card or contactless electronic tag type, the said NFC system being capable of operating in at least two communication modes including a reader mode and a card emulation mode or a Peer-to-Peer mode.

According to a characteristic of the invention, the mobile communication device may comprise means for saving and storing the preselection.

BRIEF DESCRIPTION OF THE DRAWINGS

Other features and advantages of the invention will become clearly apparent on reading the description, which is given by way of non-limiting example and with reference to the appended drawing, in which:

FIG. 1 illustrates an NFC system in which a mobile terminal communicates with an NFC target.

The invention will become clearer in the description below of a mode of embodiment provided as a non-limitative example.

A mobile communication device, such as a mobile terminal, comprises an NFC system.

The NFC system is an electronic component such as a controller, called the "NFC controller". The mobile terminal integrates the NFC function carried out by the NFC controller. That component is programmed by all the application processors in mobile terminal 1. The standards ETSI TS 102.613 and TS 102.622, for example, provide for the setting up of the NFC controller 2 with a SIM card.

The NFC controller operates in at least two modes—the card emulation and reader modes, or the card emulation and P2P modes. The NFC controller continuously switches the modes automatically and rapidly. In that way, the controller is capable of detecting a card in its magnetic field or a field provided by a remote reader. Such rapid and automatic mode switching without the knowledge of the user is called "mode switch". When the reader or P2P mode is active, the mobile terminal is capable of accessing and reading information stored in a target NFC system such as a card or a contactless electronic tag containing a piece of application data formatted according to a technical specification.

A technical specification called NDEF (NFC Data Exchange Format) specification makes it possible for example, to activate definite applications. For example, a given type of NDEF specification makes it possible, after reading, to automatically switch the ringer of an NFC mobile telephone to Vibrate mode or Silent mode.

A user is capable of reading a contactless electronic tag containing a given type of NDEF specification or equivalent, carrying out an automatic preselection relating to an application that is visually represented on the said contactless electronic tag (for example the logo of the payment operator). In that way, the preselection of applications, using the card emulation mode, is carried out by first reading formatted data from a contactless electronic tag. That operation may be carried out before the transaction targeted by the user (payment, ticket, access) if the user knows that their terminal is not correctly set up, the transaction being carried out in card emulation mode, or after the transaction targeted by the user if the transaction has failed.

In one mode of embodiment of the invention, the piece of formatted application data, for example of the NDEF specification type contained in the contactless electronic tag provides information about the condensed name of the application. As a result, during the stage wherein data stored in the target NFC system are read, data are extracted that are capable of identifying the application.

The application identifier is for instance encoded according to specification RFC3936 (Uniform Resource Identifier: general syntax) and is condensed according to specification RFC 1321 (The MD5 Message-Digest Algorithm). In that way, the quantity of data exchanged between the terminal and the contactless electronic tag is limited. The size of the data exchanged relating to the Uniform Resource Identifier (URI) identifying the application is advantageously condensed through the use of a standard 128-bit hashing function (e.g. MD5, SHA-1 etc.), regardless of the length of the URI.

In a second mode of embodiment of the invention, the piece of formatted application data, for example of the NDEF specification type contained in the contactless electronic tag, provides information about the period of validity or persistence of the validity. To that end, a second field contained in the piece of formatted applicative data provides information to the terminal mobile about the persistence of the preselection. In that way, during the stage wherein data stored in the target NFC system are read, data are extracted that are capable of identifying the validity period or persistence of the application.

Preferentially, a user interface of the said mobile communication device is used for selecting the validity period.

In a first variant of the second mode of embodiment, the persistence of the preselection is permanent.

In another variant of that second mode of embodiment, the persistence of the preselection is temporary. It may be valid for a time T determined by the user or by default, or may be valid for one transaction only or for a definite number of transactions.

Preferentially, the validity period of the application is temporary by default. A stage for confirming the validation period is carried out by the user. If they wish, the user can modify the period of validity of the preselection, for instance through the user interface.

In another mode of embodiment, the piece of formatted application data, for example of the NDEF specification type, contains data capable of locating a server so as to download a so-called over-the-air application, that is to say an application that allows remote access to data, for instance when the application is not installed in the terminal or is incomplete or obsolete.

In a variant of the aforementioned embodiment mode where an application can be downloaded, the formatted applicative data, for example of the NDEF specification type, of the contactless electronic tag contains the application that is to be hosted in the mobile terminal. That allows the deployment of an application that is local in nature. Preferentially, the persistence of the application in the host is temporary. In that way, an application may be activated for a given number of transactions or for a definite period.

Once the preselection is achieved, it is then saved and stored in the mobile terminal so as to be called up subsequently by the user of the mobile terminal. The user can then programme a number of preselections and use them in environments where these electronic tags are not available or deployed.

Such an application making the preselection must advantageously be activated and be listening so as to use the piece of formatted application data contained in the contactless electronic tag read by the terminal when the reader mode is active.

When the contactless electronic tag is read, the preselection application is activated directly, which leads to preselection in the host device hosting the applications to preselect.

A transaction, for example in a transport network, must be fast and must not require any intervention by the user. The user carries out a simple operation for a transaction that does not exceed a fraction of a second. If by inadvertence, the preselection is not appropriate and does not authorise the transaction, a second equivalent operation using the method in the invention makes it possible to preselect the application appropriately and thus carry out the transaction correctly.

It will be understood, within the scope of the invention, that these modes of embodiment are provided as non-limitative examples. The validity period of the preselection may for example be optional or otherwise, defined by default or by the user.

The technology described is compatible with products of the NFC-compatible SIM card type integrated in a terminal comprising an NFC system and operating in accordance with ETSI standards. It will also be understood that the invention may be extended to any terminal that can emulate a contactless card regardless of the nature of the secure or unsecure element, hosting the applications.

Such a preselection method that is advantageously automatic and a mobile communication device using the method allow the temporary or permanent preselection of an application or a group of applications through a simple, fast and user friendly operation generating the reading of a contactless electronic tag containing the definition of the appropriate preselection.

Such a method makes it possible to preselect one or more applications that can share the same parameters relating to NFC technology. It is possible to preselect several applications contained in a same electronic tag as long as there is no functional conflict between them. Three may be a functional conflict between two payment methods, unlike a payment method and a loyalty application.

A user does not have to navigate in a complex selection menu in order to preselect the applications using the usual user interface of their terminal.

The invention claimed is:

1. A method for the preselection of at least one application in a NFC capable mobile communication device, wherein
   a. the said NFC capable mobile communication device being capable of accessing and reading information stored in an NFC target,
   b. the said NFC capable mobile communication device being capable of operating in at least two communication modes including a card emulation mode and another mode selected from a reader mode, and a Peer-to-Peer mode, the method comprising:
      continuously switching between the card emulation mode and the another mode;
      when the NFC capable mobile communication device is in reader mode or in Peer-to-Peer mode, reading information stored in the NFC target said information containing an application identifier; and
      when in card emulation mode, preselecting an application corresponding to the application identifier.

2. The method according to claim 1 further comprising detecting the presence of the NFC target by means of the automatic continuous switching of operating modes.

3. The method according to claim 1 further comprising during the stage wherein data stored in the NFC target are read, extracting data that are capable of identifying the application and a period of validity of the application.

4. The method according to claim 3 wherein the period of validity of the application is automatically temporary by default.

5. The method according to claim 3 further comprising defining a stage wherein the period of validity is confirmed by a user.

6. The method according to claim 5 further comprising operating a means of the user interface of the said mobile communication device to select the period of validity.

7. The method according to claim 1 wherein the formatted application data of the contactless tag comprise data capable of locating a remote server.

8. The method according to claim 7 wherein a remote server is located so as to download an application when the application is missing from the mobile communication device or is incomplete or obsolete.

9. The method according to claim 1 wherein the contactless electronic tag contains the application to host in the mobile communication device.

10. An NFC capable mobile communication device comprising:
    an NFC system, the device being capable of accessing and reading data stored in an NFC target of the contactless electronic tag or card type, the said NFC system being capable of operating in at least two communication modes including a card emulation mode and a reader mode, or a card emulation mode, and a Peer-to-Peer mode;
    means to, when the NFC system is in reader mode or Peer-to-Peer mode, read information stored in the NFC target said information containing an application identifier; and
    means to, when in card emulation mode, preselect an application corresponding to the application identifier.

11. The mobile communication device according to claim 10 further comprising means to detect the presence of the NFC target by means of the automatic switching of operating modes.

12. The mobile communication device according to claim 10 further comprising means to, during the stage wherein data stored in the NFC target are read, extract data that are capable of identifying the said at least one application and the period of validity of the said at least one application.

13. The mobile communication device according to claim 12 wherein the period of validity of the application is automatically temporary by default.

14. The mobile communication device according to claim 10 further comprising means to define a stage wherein the period of validity is confirmed by a user.

15. The mobile communication device according to claim 14 comprising means of the user interface of the said mobile communication device to select the period of validity.

16. The mobile communication device according to claim 10 wherein the formatted application data of the contactless tag comprise data capable of locating a remote server.

17. The mobile communication device according to claim 16 wherein a remote server is located so as to download an application when the application is missing from the mobile communication device or is incomplete or obsolete.

18. The mobile communication device according to claim 10 wherein the contactless electronic tag contains the application to host in the mobile communication device.

* * * * *